United States Patent
Banzhaf et al.

(10) Patent No.: US 6,269,870 B1
(45) Date of Patent: Aug. 7, 2001

(54) EXHAUST HEAT EXCHANGER

(75) Inventors: Matthias Banzhaf, Heilbronn; Martin Bauer, Ludwigsburg; Claus Beck, Esslingen; Martin Bott, Niefern; Steffen Brunner, Weissach i. T.; Frank Büche, Weinstadt; Guido Domke, Stuttgart; Markus Esslinger, Fellbach; Stefan Felber, Schwieberdingen; Bernd Grünenwald, Nürtingen; Bert Hiller, Neckarwestheim; Wolfgang Knödler, Waiblingen; Rainer Lutz, Bissingen; Joachim Schemel, Ebersbach; Albert Schmitz, Simmozheim; Peter Schwartz, Hemmingen; Rainer Tränkle, Ostfildern, all of (DE)

(73) Assignee: Behr GmbH & Co., Stuttgart (DE)

( * ) Notice: Subject to any disclaimer, the term of this patent is extended or adjusted under 35 U.S.C. 154(b) by 0 days.

(21) Appl. No.: 09/296,469

(22) Filed: Apr. 22, 1999

(30) Foreign Application Priority Data

Apr. 24, 1998 (DE) ............................................. 198 18 355
Feb. 19, 1999 (DE) ............................................. 199 07 163

(51) Int. Cl.$^7$ ...................................................... F28F 9/02
(52) U.S. Cl. ............................................ 165/158; 165/177
(58) Field of Search ............................... 165/83, 158, 177

(56) References Cited

U.S. PATENT DOCUMENTS

| 1,739,018 | 12/1929 | Shipley ................................. 165/158 |
| 3,297,081 | 1/1967 | Nunemaker ........................... 165/159 |
| 3,696,228 | 10/1972 | Thomas, Jr. et al. .................. 219/76 |
| 3,812,907 | 5/1974 | Linning ................................. 165/83 |
| 3,822,741 | 7/1974 | Lippitsch .............................. 165/83 |
| 4,418,859 | * 12/1983 | Devine, Jr. ............................ 228/183 |
| 4,463,061 | * 7/1984 | Otoguro et al. ...................... 428/683 |
| 5,279,261 | * 1/1994 | Moscone .............................. 122/17 |
| 5,871,045 | * 2/1999 | Hirth et al. ............................ 165/160 |

FOREIGN PATENT DOCUMENTS

| 1551479 | 4/1970 | (DE) . |
| 3132078 | 3/1982 | (DE) . |
| 19540683 | 5/1997 | (DE) . |

* cited by examiner

*Primary Examiner*—Allen Flanigan
(74) *Attorney, Agent, or Firm*—Crowell & Moring, LLP

(57) ABSTRACT

In a heat exchanger used especially as an exhaust heat exchanger, provision is made for tube sheets, the tubes of a tube bundle, and a housing to be shaped from stainless steel sheets. The tube sheets are formed as deep-drawn and stamped parts, each of which has a circumferential wall that projects outward beyond the ends of the tubes in the tube bundle. The walls are welded to the housing, and each of the walls is abutted by a diffuser.

10 Claims, 3 Drawing Sheets

FIG. 7
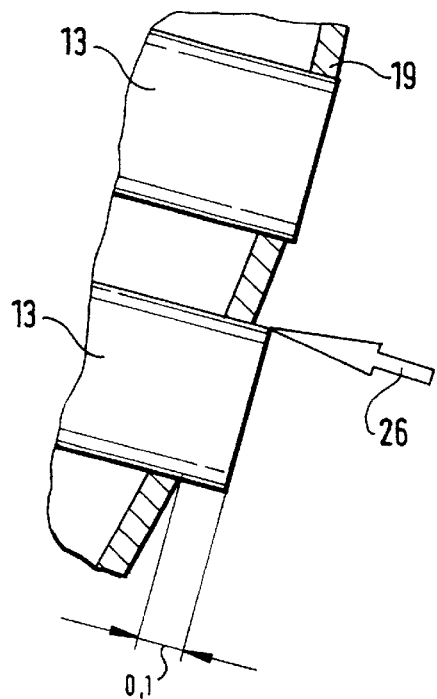
FIG. 8
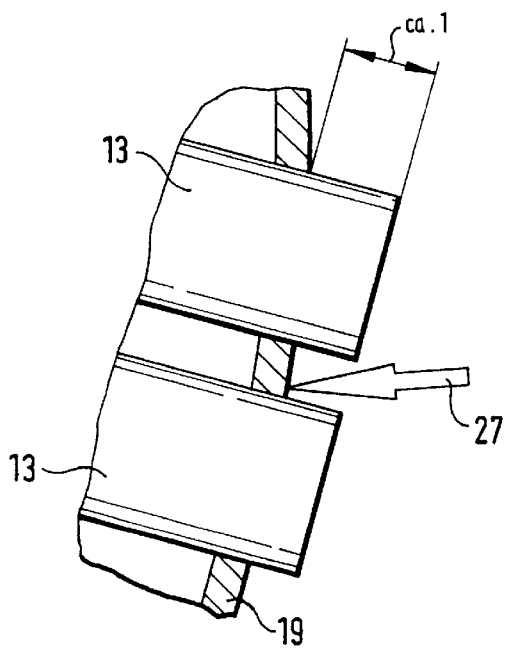
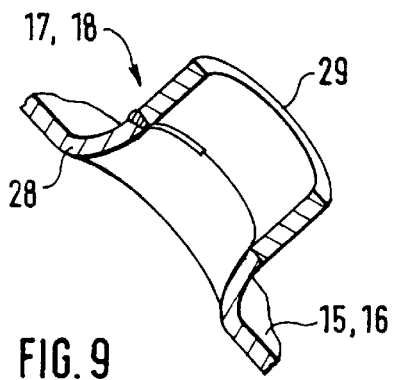
FIG. 9
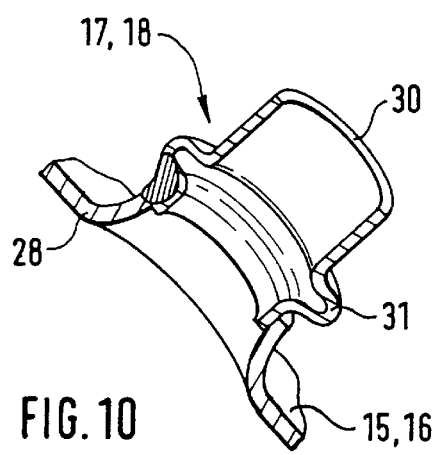
FIG. 10

EXHAUST HEAT EXCHANGER

This application claims the priority of German patent application Nos. 198 18 355.0 and 199 07 163.2, filed Apr. 24, 1998 and Feb. 19, 1999, respectively.

BACKGROUND AND SUMMARY OF THE INVENTION

The present invention relates to a heat exchanger, especially an exhaust heat exchanger, with tubes held at both ends in tube sheets to guide a gaseous medium and with a housing abutting the tube sheets and surrounding the tubes for guiding a liquid coolant. The tube sheet, the tubes and the housing are shaped from heat-resistant austenitic steel sheets, with the tubes welded into, and the housing welded to, the tube sheets.

A heat exchanger of this general type is known from German patent document DE 195 40 683 A1. This German patent document corresponds to co-pending U.S. patent application Ser. No. 08/743,002, filed Nov. 1, 1996.

The primary object of the invention is to design a heat exchanger of the type mentioned above such that it can be manufactured economically and advantageously in terms of welding technology.

This object is achieved by shaping the tube sheets as deep-drawn and punched parts, each of which has a circumferential wall that projects outward beyond the ends of the tubes. Each wall is welded to the housing and abuts a diffuser.

The design of the heat exchanger according to the invention permits welding in which as little heat as possible is conducted into the tube sheets, especially when welding parts to the tube sheets, so that deformation of the tube sheets by heat is reliably prevented.

In one advantageous embodiment of the invention, the housing and the tube sheets are trimmed in the vicinity of the surrounding walls after the welded connections have been made. In this fashion, a heat exchanger can be produced that maintains, with high accuracy, installation tolerances that are required especially in motor vehicles.

In another embodiment of the invention, the housing and the tube sheets are welded together by a circumferential auxiliary seam and by a sealing seam provided closer to the tube ends. The housing and tube sheets are cut to length in the vicinity of the auxiliary seam. Thus, the housing and the tube sheets form a tightly closed edge. Since the actual sealing seam can be placed relatively close to the area of a tube sheet that receives the tube ends, the possibility of crevice corrosion taking place in the area between the tube sheet and the housing is largely eliminated.

In an advantageous embodiment, a diffuser is butt-welded to the circumferential trimmed edge. As a result, an advantageous welded connection is created between the diffuser and the edge at which partial compensation for length tolerances can be made. In another embodiment of the invention, the housing has larger cross sections adjacent to the tube sheets than in the area located therebetween, in which it surrounds of the tubes at a short distance. In the area with a larger cross section, a type of water box is thus created in which the liquid coolant distributes itself over the entire cross section of the heat exchanger.

In another embodiment of the invention, the tubes are provided with externally projecting bump-shaped projections by which they are supported against one another and against the inside wall of the housing. This increases the stability of the entire heat exchanger, with the production of noise, caused by introduced vibrations or oscillations, being largely eliminated at the same time.

In another embodiment of the invention, the housing that is assembled from at least two shaped sheet-metal parts is welded by welded seams that run parallel to the tubes. Even when the welded seams are produced, only small quantities of heat are conducted into the tubes or tube sheets. Provision is advantageously made such that the welded seams are straight butt welds in the vicinity of the largest housing cross section. The result is a largely smooth outer contour of the heat exchanger in this area. Provision is also made for the welded seams in the vicinity of the smaller housing cross section to be in the form of crimped seams. In this way it is possible to allow the welded seam to be on one level throughout. It is especially advantageous when the housing parts are welded while being elastically pretensioned. The elastic pretensioning, which causes the edges of the sheet metal parts to be joined to fit together tightly, also ensures that the housing parts, following welding, abut one another in the vicinity of the smaller housing cross section under pretension against the bumps on the outer tubes of the tube bundle so that the risk of noise being produced by vibration is further reduced.

This elastic pretensioning is provided mainly in the vicinity of the crimped seams.

In another embodiment of the invention, the housing is made of a tubular section with two end areas which are expanded. This creates a one-piece housing jacket that is easy to handle during assembly.

In another embodiment of the invention, the tubes are welded to the tube sheets by laser beam welding or electron beam welding. In order to be able to perform this welding precisely, the tube sheets are provided with positioning aids located at predetermined positions. As a result, it is possible to align the tube sheets exactly with the tubes during welding.

In another embodiment of the invention, the tubes are inserted into the tube sheets with a specified excess length and the welded seams are made immediately adjacent to the outside walls of the tubes using laser or electron beams striking at an angle. This is especially advantageous in larger heat exchangers, in other words in heat exchangers with a tube bundle consisting of a plurality of tubes. With a large number of tubes, it is almost impossible to prevent the tube sheets from being slightly deformed when the tubes are inserted into the holes in the sheets. This deformation can be overcome by welding with beams that strike at an angle so that the risk of incomplete or leaky welds is largely avoided.

In another embodiment, the housing is provided, in one area with a larger cross section, with a connecting tube to supply the coolant and in another area with a larger cross section with a connecting tube for removing coolant. The housing is further provided with beams, directed outward, to which the connecting tubes are welded. This also produces an economical solution that is advantageous from the welding standpoint for attaching the connections for the coolant.

Additional features and advantages of the invention will be apparent from the following description of preferred embodiments.

BRIEF DESCRIPTION OF THE DRAWINGS

FIG. 7 is a partial section in the vicinity of the connection between the tubes and the tube sheets of a heat exchanger according to the invention;

FIG. 8 is a partial section similar to FIG. 7 with a systematic projection of the tubes on the corresponding tube sheets;

FIG. 9 is a section along line IX—IX in FIG. 1;

FIG. 10 is a partial section similar to FIG. 9 through a modified embodiment;

DESCRIPTION OF THE PREFERRED EMBODIMENTS

Figure 3:
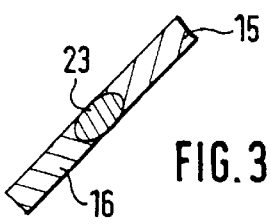
FIG. 3 is a partial section through the housing of the heat exchanger along line III—III in FIG. 1.

In the drawings, each of the partial sections is shown on an enlarged scale.

Figure 1:
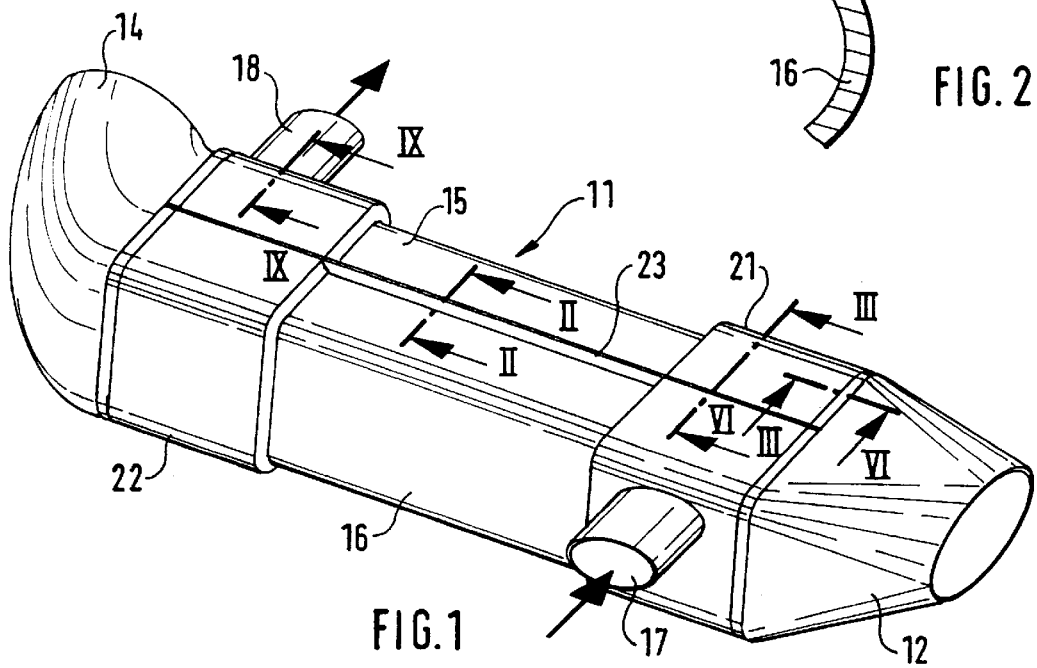
FIG. 1 is a perspective view of a heat exchanger according to the invention.

The heat exchanger 11 shown in FIG. 1 is particularly useful as an exhaust heat exchanger in which exhaust is cooled. The exhaust flows through a diffuser 12 and is guided inside the heat exchanger 11 by a tube bundle 13, made of tubes with rectangular cross sections, to a diffuser 14, from which it escapes. In the area between diffusers 12, 14, the tube bundle 13 is surrounded by a housing composed of two parts 15, 16. A liquid coolant that flows around the tubes of tube bundle 13 is guided in this housing. Coolant is supplied to a coolant supply connection 17 and to a coolant drain connection 18 which are located essentially diametrically with respect to one another. The coolant flows in the same direction as the exhaust to be cooled.

Tube bundle 13 consists of rectangular tubes like those known, for example, from co-pending U.S. patent application Ser. No. 08/743,002. The rectangular tubes have V-shaped pairs of tabs that project from opposite inside walls; these tabs are provided alternately on opposite walls. The rectangular tubes are also provided on their exteriors with bump-like projections by which they abut one another and the housing composed of the parts 15, 16. The ends of the rectangular tubes of the tube bundle 13 are tightly welded into tube sheets 19.

Pot-shaped deep-drawn sheet-metal shaped parts are used as the tube sheets 19, which have bottoms provided with punched holes to receive the tubes of the tube bundle 13. In addition, the tube sheets 19 form surrounding walls 20 that project in the directions of diffusers 12, 14 beyond the ends of the tubes of the tube bundle 13. As will be described in greater detail below, the sheet-metal shaped parts 15, 16 for the housing are welded to these walls 20 of the tube sheets 19.

Figure 2:
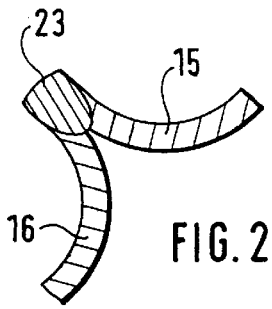
FIG. 2 is a partial section through the housing of the heat exchanger along line II—II in FIG. 1.

The housing is assembled from the two shaped sheet-metal parts 15, 16. The housing has areas 21, 22 with larger cross sections that abut the diffusers 12, 14. These areas form water-distributing boxes shaped as annular passages. The supply connection 17 and the exhaust connection 18 are provided to these passages on opposite sides of the heat exchanger. The middle area of the housing between the two outer areas 21 and 22 has a smaller cross section. In this area, the housing is at a distance from the tubes of the tube bundle 13; this distance is determined by the bump-like projections of the tubes. The shaped sheet-metal parts 15, 16 are connected by welded seams 23 that run in the lengthwise direction. Each welded seam 23 is made as a straight butt weld (FIG. 3) in the areas 21, 22 with the larger cross sections and as a crimped seam (FIG. 2) in the area in between with the smaller cross section. This ensures that each welded seam 23 runs at a constant height level and thus can be made in one pass in simple fashion. During welding of the welded seams 23, the two shaped sheet-metal parts 15, 16 are pressed against one another so that the shaped sheet-metal parts are pressed close together in the vicinity of the straight butt weld and also in the vicinity of the crimped seam. The shaped sheet-metal parts 15, 16 are made slightly elastic in the vicinity of the crimped seam so that, after welding, the housing in the middle area that has a smaller cross section abuts the bump-shaped projections of the tubes in the tube bundle 13 with elastic pretensioning.

Before the lengthwise seams 23 are welded, the shaped sheet-metal parts 15, 16 are placed against the walls 20 of tube sheets 19 (FIGS. 3, 4, and 5) that are provided with the tube bundle 13. The lengthwise seams 23 are also welded in the vicinity of the walls 20 of the tube sheets 19, so that when welded seams 23 are applied, the tube sheets 19, together with the housing formed from the two shaped sheet-metal parts 15, 16, are stitched together. Then, the housing made of the two shaped sheet-metal parts 15, 16 is welded to the tube sheets 19 in the vicinity of walls 20. Initially, an auxiliary seam 24 is provided at a greater distance from the bottoms of the tube sheets 19. Then a sealing seam 25 is welded; the sealing seam is closer to the bottom of a tube sheet 19 and preferably is located immediately in front of the transition between wall 20 and the bottom of tube sheet 19.

The rectangular tubes of the tube bundle 13 are welded to the tube sheets 19 before or even after the mounting and welding of the housing. Tube sheets 19 are mounted on the ends of the rectangular tubes of the tube bundle 13. Then, the ends of the rectangular tubes are expanded slightly by plastic deformation so that only a small gap exists between the punched holes in the tube sheets 19 and the rectangular tubes, allowing tight laser beam welding or electron beam welding. A fitted connection between the tube bundle 13 and the tube sheets 19 is created by expansion that makes it possible to mount the housing made of the shaped sheet-metal parts 15, 16 and to weld it without the tube sheets 19 already being welded to the tube bundle 13.

Figure 11:
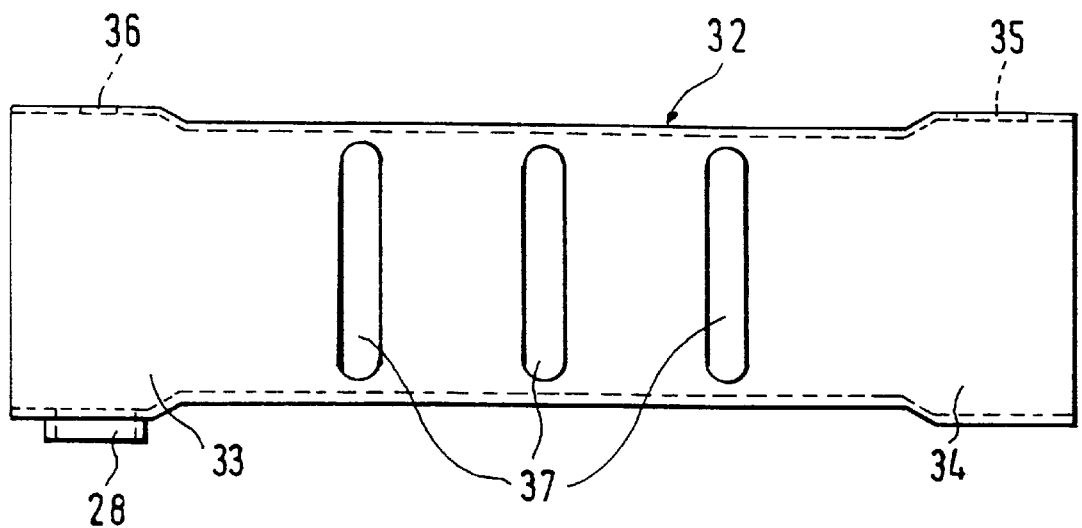
FIG. 11 is a view of a housing jacket formed from a one-piece tube section.
Figure 12:
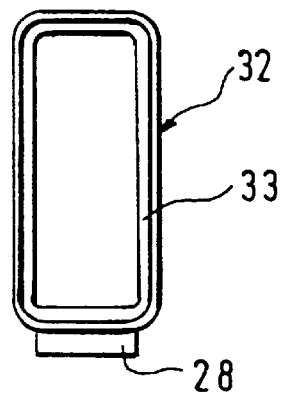
FIG. 12 is a view of the housing jacket looking in the axial direction.

FIGS. 11 and 12 show a housing jacket 32 from which a heat exchanger 11 can be made in suitable fashion. Housing jacket 32 consists of a section of a welded rectangular tube. The two end areas 33, 34 are expanded in order to form water distribution boxes in the form of annular passages. Connections for supplying and removing water, such as simple punched holes 35 and 36 or an outwardly directed beam 28, are provided in these expanded areas. When an especially long tube jacket 32 is provided, it is advantageous to reinforce the jacket with outwardly shaped transverse beads 37 as shown in FIG. 11.

In this design, a tube bundle 13 made of rectangular tubes is fitted into housing jacket 32. Then tube sheets 19 are installed and pressed into the expanded end areas 33, 34, preferably with a light press fit. As a result, a fitted connection is obtained even before welding that permits convenient handling of the object thus assembled. Then the tube sheets 19 are welded to the housing jacket 32 in the end areas 33, 34 with the aid of an auxiliary seam 24 and a sealing seam 25. The rectangular tubes of the tube bundle 13 are similarly welded to the tube sheets 19. Optionally, the tube sheets 19 can be welded to the rectangular tubes before or after the welding of the tube sheets 19 to the housing jacket 32.

The tubes of the tube bundle 13 have relatively thin walls with a thickness on the order of 0.2 mm to 0.6 mm. It is therefore necessary for the welded seams produced around the tubes of the tube bundle 13 to be applied precisely. For this purpose, it is necessary for the tube sheets 19 to be positioned very precisely relative to the tube bundle 13 in a welding jig. In order to facilitate this positioning, in a manner not shown in greater detail, the tube sheets 19 are provided with positioning aids. As mentioned above, the welding of the tubes in the tube bundle 13 and in tube sheets 19 is preferably performed by laser beam welding or even electron beam welding. If welding is performed in a conventional fashion so that the laser beam or electron beam, indicated by an arrow 26 in FIG. 7, is aimed parallel to the tube axes, then it is important to ensure that no shifts in position occur during assembly of the tube sheets 19 as a result of deformations of the tube sheet. In heat exchangers with a tube bundle 13 made of a large number of tubes, sagging frequently occurs and position shifts of more than 0.1 mm cannot be avoided. In this case it is advantageous to produce regularly an excess length like that shown in FIG. 8 when mounting the tube sheets 19 on the tube ends of the tube bundle 13. Welding is performed using a diagonally directed laser beam or an electron beam as indicated by arrow 27. The beam is inclined at an angle between 5° and 10° relative to the tube axes and is directed at the tube sheet in the immediate vicinity of the outside walls of the tube. When the tubes in the tube bundle 13 are welded into tube sheets 19, the welded seams can be made to fit the contour of the tubes using so-called window welding or along the grid formed by the recesses in the tube sheet using so-called grid welding. It may be advisable to provide an annular weld in the vicinity of the ribs between opposite corners of the rectangular tubes as an additional sealing weld or possibly to add a welded seam as a cover layer on the ribs of tube sheets 19 between the tubes.

Figure 5:
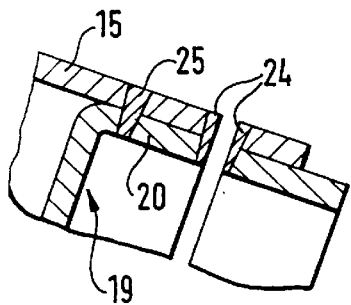
FIG. 5 is a partial section along line V—V in FIG. 4.
Figure 4:
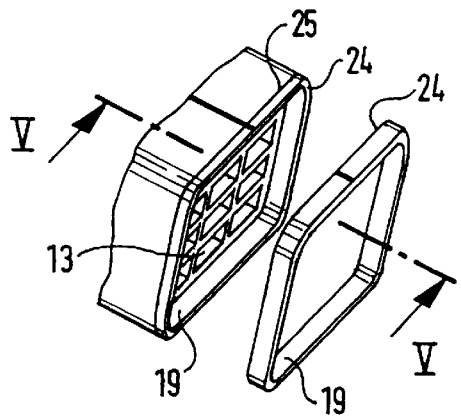
FIG. 4 is a perspective partial view of the end area of a heat exchanger according to the invention before its manufacturing is complete.
Figure 6:
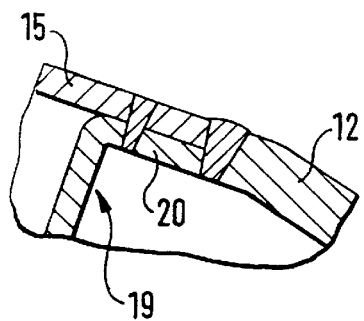
FIG. 6 is a partial section along line VI—VI in FIG. 1.

After the basic body of heat exchanger 11 has been assembled, in other words after the housing has been put together and welded from the shaped sheet-metal parts 15, 16 and the tube bundle 13 has also been welded into tube sheets 19, or after the basic body has been produced in the manner explained using the one-piece housing jacket 32 according to FIGS. 11 and 12, the basic heat exchanger body is trimmed to a specified size as shown in FIGS. 4 and 5. This trimming is preferably performed in the vicinity of the auxiliary seams 24 by a laser cutter. As a result of trimming in the vicinity of auxiliary seams 24, a tightly closed edge remains that is composed of the ends of the shaped sheet-metal parts 15, 16 and the walls 20 of tube sheets 19. The diffusers 12 and 14 abut this edge. Preferably, the diffusers 12, 14 are butt-welded, as shown in FIG. 6. It is also possible, however, to insert the diffusers into the circumferential edge or to mount them externally on the circumferential edge and then to weld them internally to the walls 20 of tube sheets 19 or externally to the shaped sheet-metal parts 15, 16. Diffusers 12 and 14 can be made as cast parts, deep-drawn parts, or even as welded parts. During assembly, they are applied so that the tolerances that result during their manufacture are compensated to the point at which the required installation dimensions for the entire heat exchanger 11 are maintained.

To form the coolant connections 17, 18, shaped sheet-metal parts 15, 16 are provided with outwardly directed beams 28. A connecting tube is butt-welded to beams 28 in the embodiment according to FIG. 9. This welding can be performed for example by WIG welding with orbital welding tongs. In the embodiment according to FIG. 10, the connecting tube 30 is provided with a circumferential bead 31 and inserted into beam 28. Welding is performed in the fitted area. This welding can be performed as WIG welding, for example, using a robot.

For the tubes in the tube bundle 13 and for the tube sheet 19, a heat-resistant austenitic steel 16 is selected that is largely resistant to corrosion, especially by sulfuric acid in the exhaust. A heat-resistant austenitic steel is likewise provided for the shaped sheet-metal parts 15, 16 on the housing. The tubes of the tube bundle 13 have a relatively limited wall thickness, for example on the order of 0.2 mm to 0.6 mm, since the heat transfer between the exhaust and a liquid coolant takes place in their vicinities. Tube sheets 19 and shaped sheet-metal parts 15, 16 or housing jacket 32 have much greater wall thicknesses which are, for example, on the order of 1 mm. The shaped sheet-metal parts 15, 16 can be welded to one another and the tube sheets 19 and the diffusers 12, 14 can likewise be welded by laser beam welding. However, other welding methods, such as electron beam welding, MIG welding, WIG welding, or even plasma welding, can be used.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An exhaust heat exchanger, comprising:
   tubes held in tube sheets at both ends for guiding a gaseous medium and defining a tube bundle,
   a housing adjoining the tube sheets and surrounding the tubes for guiding a liquid coolant, the tube sheets, the tubes, and the housing being made from heat-resistant austenitic steel sheet, the tubes being welded into the tube sheets, and the housing being welded to the tube sheets, the tube sheets being deep-drawn stamped parts,
   a circumferential wall included in each of said stamped parts that projects outward beyond ends of the tubes of the tube bundle, and
   a diffuser abutted by each circumferential wall, each circumferential wall being welded to said housing,
   wherein said housing and said tube sheets are cut to length in the vicinity of the circumferential walls following production of the welded connections,
   wherein said housing and said tube sheets are welded together by a circumferential auxiliary seam and by a sealing seam applied closer to the ends of the tubes, and
   wherein the housing and the tube sheets are cut to length in the vicinity of the auxiliary seam.

2. Heat exchanger according to claim 1, wherein each diffuser is butt-welded to the circumference and cut to length.

3. An exhaust heat exchanger, comprising:
   tubes held in tube sheets at both ends for guiding a gaseous medium and defining a tube bundle,
   a housing adjoining the tube sheets and surrounding the tubes for guiding a liquid coolant, the tube sheets, the tubes, and the housing being made from heat-resistant austenitic steel sheet, the tubes being welded into the tube sheets, and the housing being welded to the tube sheets, the tube sheets being deep-drawn stamped parts, a circumferential wall included in each of said stamped parts that projects outward beyond ends of the tubes of the tube bundle, and a diffuser abutted by each circumferential wall, each circumferential wall being welded to said housing, wherein the housing, adjacent to said tube sheets, has areas with cross sections that are larger than a cross section in the area located therebetween in which the housing surrounds the tubes of said tube bundle with a small distance between them, and wherein the housing is assembled from at least two shaped sheet-metal parts and is welded by welded seams that extend parallel to the tubes of said tube bundle.

4. Heat exchanger according to claim 3, wherein the welded seams are made, in the areas with the larger cross sections, as straight butt welds.

5. Heat exchanger according to claim 3, wherein said welded seams are crimped seams in the areas with smaller housing cross sections.

6. Heat exchanger according to claim 3, wherein the housing parts are welded while elastically pretensioned.

7. An exhaust heat exchanger, comprising:

tubes held in tube sheets at both ends for guiding a gaseous medium and defining a tube bundle, a housing adjoining the tube sheets and surrounding the tubes for guiding a liquid coolant, the tube sheets, the tubes, and the housing being made from heat-resistant austenitic steel sheet, the tubes being welded into the tube sheets, and the housing being welded to the tube sheets, the tube sheets being deep-drawn stamped parts, a circumferential wall included in each of said stamped parts that projects outward beyond ends of the tubes of the tube bundle, and a diffuser abutted by each circumferential wall, each circumferential wall being welded to said housing, wherein said housing is provided, in a first area with a larger cross section, with a connecting tube for a coolant inlet and, in a second area with a larger cross section, with a connecting tube for a coolant drain, and wherein said housing is provided with outwardly directed beams to which said connecting tubes are welded.

8. Heat exchanger comprising:

a tube bundle, having opposite ends, which guides a gaseous medium, tube sheets holding said opposite ends of said tube bundle, a housing surrounding the tube bundle and guiding a liquid coolant, circumferential walls included in said tube sheets that project outward beyond ends of the tube bundle, and diffusers abutting the circumferential walls, wherein the circumferential walls are welded to said housing, wherein the housing, adjacent to said tube sheets, has areas with cross sections that are larger than a cross section in the area located therebetween in which the housing surrounds the bundle, and wherein the housing is assembled from at least two shaped sheet-metal parts and is welded by welded seams that extend parallel to the tube bundle.

9. Heat exchanger according to claim 8, wherein the welded seams are made, in the areas with the larger cross sections, as straight butt welds.

10. Heat exchanger according to claim 8, wherein said welded seams are crimped seams in the area located between the areas with the larger cross sections.

* * * * *